United States Patent [19]

Johnson

[11] Patent Number: 4,664,989

[45] Date of Patent: May 12, 1987

[54] LIQUID CATHODE CELL SYSTEM EMPLOYING A COILED ELECTRODE ASSEMBLY

[75] Inventor: Daniel H. Johnson, Westlake, Ohio

[73] Assignee: Union Carbide Corporation, Danbury, Conn.

[21] Appl. No.: 783,533

[22] Filed: Oct. 3, 1985

[51] Int. Cl.[4] .............................................. H01M 6/14

[52] U.S. Cl. ....................................... 429/94; 429/194

[58] Field of Search .................................. 429/94, 194

[56] References Cited

U.S. PATENT DOCUMENTS 3,809,580 5/1974 Jagid .................................. 429/185
3,900,340 8/1975 Greaser et al. ....................... 429/94
4,020,248 4/1977 Goebel ................................ 429/164
4,375,501 3/1983 Peled et al. ........................... 429/94
4,454,208 6/1984 Osmialowski ....................... 429/163
4,476,202 10/1984 Wesner ................................ 429/94
4,565,752 1/1986 Goebel et al. ........................ 429/94
4,565,753 1/1986 Goebel et al. ........................ 429/94

FOREIGN PATENT DOCUMENTS 1542690 3/1979 United Kingdom .

*Primary Examiner*—Anthony Skapars

[57] ABSTRACT

A nonaqueous cell employing a liquid cathode-electrolyte and a coiled electrode assembly in which an anode strip is the innermost wound electrode and an anode collector strip is extended beyond the anode strip so that said anode collector strip forms at least a portion of the outer wall of the coiled electrode assembly so that when the assembly is positioned in a container, the anode collector will electronically contact the inner wall of the container adapting it as the anodic terminal of the cell.

13 Claims, 4 Drawing Figures

LIQUID CATHODE CELL SYSTEM EMPLOYING A COILED ELECTRODE ASSEMBLY

FIELD OF THE INVENTION

The invention relates to liquid cathode cell systems employing a coiled electrode assembly in which an anode strip is the innermost wound electrode and an anode collector strip of the assembly is extended so that it forms at least a portion of the outer wall of the coiled electrode assembly so that when the coiled electrode assembly is positioned in the cell container, the anode collector will electronically contact the inner wall of the cell container adapting it as the anodic terminal for the cell.

BACKGROUND OF THE INVENTION

The continuing development of portable electrically powered devices such as tape recorders and playback machines, radio transmitters and receivers, and the like, create a continuing demand for th development of reliable, long service life cells or batteries for their operations. Recently developed electrochemical cell systems that will provide a long service life utilize highly reactive anode materials such as lithium, sodium and the like, in conjunction with high energy density nonaqueous liquid cathode materials and a suitable salt.

It has recently been disclosed in the literature that certain materials are capable of acting both as an electrolyte carrier, i.e., as solvent for the electrolyte salt, and as the active cathode for a nonaqueous electrochemical cell. U.S. Pat. No. 4,400,453 discloses a nonaqueous electrochemical cell comprising an anode, a cathode collector and a cathode-electrolyte, said cathode-electrolyte comprising a solution of an ionically conductive solute dissolved in an active cathode depolarizer wherein said active cathode depolarizer comprises a liquid oxyhalide of an element of Group V or Group VI of the Periodic Table. The "Periodic Table" is the Periodic Table of Elements as set forth on the inside back cover of the Handbook of Chemistry and Physics, 63rd Edition, CRC Press Inc., Boca Raton, Fla., 1982–1983. For example, such nonaqueous cathode materials would include sulfuryl chloride, thionyl chloride, phosphorous oxychloride, thionyl bromide, chromyl chloride, vanadyl tribromide and selenium oxychloride.

Another class of liquid cathode materials would be the halides of an element of Group IV to Group VI of the Periodic Table. For example such nonaqueous cathode material would include sulfur monochloride, sulfur monobromide, selenium tetrafluoride, selenium monobromide, thiophosphoryl cloride, thiophosphoryl bromide, vanadium pentafluoride, lead tetrachloride, titanium tetrachloride, disulfur decafluoride, tin bromide trichloride, tin dibromide dichloride and tin tribromide chloride.

However, one possible drawback to the use of a liquid cathode such as thionyl chloride is that if it is not uniformly distributed along the surface of an anode, such as lithium, via a separator, then nonuniform anode consumption could occur and may result in low voltage output, particularly at high discharge rates, and longer voltage delays after storage. In addition, nonuniform distribution of the liquid cathode could cause nonuniform anode dissolution. This nonuniform anode dissolution causes high points and plateaus to form on the anode which may possibly result in localized heating during charging (abuse condition) and might lead to the possibility of anode melting at these discrete points. This could lead to a violent venting of the cell or even to cell disassembly.

To optimize the uniform absorption of large amounts of a liquid cathode onto and into a separator, a coiled electrode assemby should be employed. In U.S. Pat. No. 3,809,580, a nonaqueous hermetically sealed cell is disclosed which employs a coiled electrode assembly. Specifically, the negative electrode comprises lithium metal pressed onto a fine copper screen (anode collector) which is insulated from the cathode by a separator of porous polyethylene. The cathode is a passive electrode (cathode collector) formed by conductive carbon mixed with glass fibers and polytetrafluoroethylene which acts as a binder, the mixture being pressed into a fine aluminum screen which acts as a cathode collector. The cathode-electrolyte used in the cell is a solution of sulfur dioxide, a cosolvent of an anhydrous organic liquid such as methylformate and a solute of lithium bromide or the like. The cathode-electrolyte solution is pressure injected into the cell through a nipple in the conventional manner. Although the components of this type of cell construction are suitable for cathode-electrolytes employing sulfur dioxide as the principle active cathode material, they would not be suitable for cathode-electrolytes employing liquid oxyhalides as disclosed in U.S. Pat. No. 4,400,453 since the oxyhalides are extremely corrosive and react with and/or dissolve many of the cell components of the prior art such as aluminum, copper, polyethylene and the like.

In British Patent No. 1,542,690, a nonaqueous cell is disclosed comprising a coiled assembly of a cathode collector sheet, an active metal anode sheet, i.e. lithium, and a nonwoven glass separator interposed between said cathode collector sheet and said anode sheet, and a cathode-electrolyte comprising a solution of an ionically conductive solute dissolved in a liquid cathode such as an oxyhalide of an element of Group V or Group VI of the Periodic Table.

If the cathode collector in these types of cell constructions is positioned to contact the wall of the cell container and the anode, such as lithium, is placed within the cathode collector, then heat from an external source must be transmitted through the cathode collector and liquid catode-electrolyte before it reaches the anode. During this period, the internal pressure will substantially increase prior to any melting of the anode and the high pressure could be released through a suitable vent before any thermal reaction occurs. In cells where the anode is disposed next to the wall of the container, the anode may melt from exposure to external heat and react with the liquid cathode-electrolyte before the internal pressure is high enough to open a vent system. Although a cell employing the external cathode collector construction is safer than a cell employing the external anode construction, the placing of the cathode collector against the wall of the container will adapt the container as the cathodic terminal, thereby restricting the material that can be employed as the container. Specifically, when the container contacts the cathode collector it becomes the cathodic terminal and is thereby subject to corrosion and chemical attack by the cathode-electrolyte.

It is an object of the present invention to provide a liquid cathode cell system with a coiled electrode assembly that is safe to operate and that can be assembled with various types of container materials.

It is another object of the present invention to provide a liquid cathode cell system with a coiled electrode assembly that has the safety feature of having an external cathode construction while at the same time being adapted for providing anodic protection for the container of the cell.

It is another object of the present invention to provide a liquid cathode cell system with a coiled electrode assembly in which the catohde collector is disposed outside of the anode and in which the anode collector is extended to contact the container of the cell so as to provide anodic protection for the container of the cell.

SUMMARY OF THE INVENTION

The invention is directed to an electrochemical cell comprising a coiled electrode assembly composed of an anodic electrode comprising an anode strip in electrical contact with an anode collector strip, said anode collector strip extending beyond the anode strip; a cathode collector strip superimposed over the anodic electrode; a first separator disposed between said anodic electrode and said cathode collector strip; and a second separator strip disposed over the cathode collector strip; all of the strips being helically wound about each other so that the anodic electrode is the innermost wound member and the extended anode collector strip defines at least a portion of the outer wall of the coiled electrode assembly; a container comprising a base and an upstanding wall defining an opening, said coiled electrode assembly disposed within the container such that the extended anode collector defining a portion of the outer wall electronically contacts the inner upstanding wall of the container thereby adapting the container as the anodic terminal for the cell; a liquid cathode-electrolyte disposed within the container and contacting the cathode collector; a cover secured to the open end of the container; and means within the container for electronically connecting the cathode collector to a terminal member disposed at the exterior surface of the cell and insulated from the anodic terminal of the cell thereby adapting the terminal member as the cathodic terminal of the cell.

As used herein and as disclosed in an article titled "Electrochemical Reactions in Batteries" by Akiya Kozawa and R.A. Powers in the Journal of Chemical Education - Vol. 49, pages 587 to 591, September 1972 issue, a liquid cathode (depolarizer) is the cathode reactant and therefor is the material electrochemically reduced at the cathode collector. A cathode collector is not an active reducible material and functions as a current collector plus electronic conductor to the cathode terminal of a cell. In addition, the cathode collector when used in conjunction with a liquid active depolarizer is a situs for the electrochemical reduction reaction of the active cathode material and the electronic conductor to the cathode terminal of a cell. An anode is a material that is electrochemically oxidized. An anode collector is not an active material and functions as a current collector plus electronic conductor to the anode terminal of a cell or it could be used as the anode terminal of a cell.

The coiled electrode asseembly for use in this invention can be prepared in a conventional manner whereby an anode strip or sheet such as lithium, is preferably superimposed on an anode collector strip or sheet such as nickel. The collector strip must extend at least beyond one end of the anode strip. The anode strip and anode collector strip are superimposed on a separator strip that is generally wider than both the anode strip and anode collector strip and preferably the anode collector stip is longer so that at least one end extends beyond both the separator strip and the anode strip. A cathode collector strip is superimposed on the separator strip and is generally shorter and narrower than the separator strip. A second separator strip is superimposed on the cathode collector strip and this separator strip again is preferably shorter than the anode collector strip and generally both wider and longer than the cathode collector strip. One end of the superimposed strips may be secured using the coring technique or the like and then that end is helically wound in a manner such that the cathode collector strip is disposed outside the anode strip in the completed coiled electrode assembly. The extended portion of the anode collector strip will define at least a portion of the outer wall of the coiled assembly while the outer separator sheet will define any remaining portion of the outer wall of the coiled assembly and insulates the cathode collector from the container. When the coiled electrode assembly in inserted into a container, the extended anode collector strip will contact the inner wall of the container and adopt it as the anodic terminal of the cell.

In another embodiment of the invention the second separator strip could be longer than the anode collector strip so that it completely surrounds the coiled electrode assembly. In this cell embodiment at least one opening could be disposed or defined in the portion of the outermost wound separator so as to expose a portion of the extended anode collector strip. This exposed anode collector strip would then define a portion of the outer wall of the coiled electrode assembly and when the coiled electrode assembly is inserted into a container, the exposed portion of the anode collector strip would contact the inner wall of the container and adapt the container as the anodic terminal of the cell. A coiled electrode assembly having an opening in an outer wound separator to expose a portion of an electrode is disclosed in U.S. Pat. No. 3,900,340. The teachings of this reference is incorporated herein by reference.

In these embodiments, the outer disposed cathode collector will surround the anode in the coiled electrode assembly to produce an interal anode type cell construction that is considered to be safer than an external anode cell construction when using liquid cathodes such as oxyhalides and anodes such as lithium. Generally a vent would be provided to insure the safe venting for any undesirable internal pressure buildup that can be caused from abuse conditions such as being disposed in an incinerator or subject to excessive high rate charging. Using the coiled electrode assembly of this invention, the cell can be made to vent before the anode reaches its melting temperature so as to prevent the anode from thermally reacting with the liquid cathode-elctrolyte.

In addition to the safety feature provided by the internal type of anode construction of the coiled electrode assembly of this invention, the extended anode collector is exposed to contact the wall of the cell container thereby providing anodic protection of the container. Thus using the coiled electrode assembly of this invention, a container made of such materials as steel and nickel-plated steel can be used. If the cathode collector were to contact the cell container, then the container would have to be made of a more expensive material such as stinless steel or tantalum, to protect it from corrosion. When using the coiled electrode assembly of this invention, a cell can be produced providing an internal anode construction while also having the anodic protection for the cell container.

The cathode collector strip could have an extended conductive tab member secured to it by wleding as disclosed in U.S. Pat. No. 2,954,417, a conductive wire secured to it as shown in U.S. Pat. No. 3,510,353, or some similar means for securing a conductive member thereto so that said conductive member can be extended and secured to a portion of the cell housing insulated from the cell container by conventional means, thereby adapting said portion of the cell housing, i.e. the cover, as the cathodic terminal for the cell.

Preferably, a terminal could be secured to and insulated from the cell housing using a conventional glass-to-metal seal and then the conductive tab could be secured to the terminal using known means so as to adapt the terminal as the cathodic terminal of the cell.

The cathode collector strip for use in this invention can be fabricated by bonding a conbonaceous material such as acetylene black with a suitable binder such as polytetrafluoroethylene and then depositing the mixture on a woven metallic conductive screen such as nickel by any conventional method such as by the paper making process or the spray process. The acetylene black can preferably be present in an amount ranging between about 60 and 95 percent by weight based on the weight of the binder and acetylene black mixture. Sheets of this material so made can then be cut into appropriate sizes to accommodate the particular cell in which it is to be employed. A conductive tab such as nickel can be welded to one end of the cathode collector sheet to be used as a tab for electrically connecting the cathode collector to the cathodic terminal of the cell.

The anode strip for use in this invention can comprise an anode foil made of lithium, sodium of caldium secured on a metallic conductive screen, such as nickel, serving as the anode collector. As stated above, in the preferred embodiment the anode collector strip is longer than the anode strip so that when the strips are coiled, the extended anode collector strip will define at least a portion of the outer wall of the assembly so that when placed in a container the anode strip will electronically contact the inner wall of the container adapting it as the anodic terminal of the cell.

The separator for use in this invention has to be chemically inert and insoluble in the liquid cathode-electrolyte, such as an oxyhalide cathode-electrolyte, and preferably have a porosity of at least about 25 percent, and more preferably about 50 percent, so as to permit the liquid cathode to permeate through and contact both the anode and the cathode collector. In addition, the thickness of the separator preferably should range between about 0.002 inch and about 0.015 inch and more preferably be about 0.009 inch. A separator thickness below 0.002 inch could be ineffective because of short circuiting while a thickness much above 0.015 inch could unduly increase the internal resistance. Suitable separators for use in this invention that will remain stable in the presence of the liquid oxyhalide cathode-electrolyte are the nonwoven glass separators, preferably those separators that comprise a uniform mixture of 85 to 95 weight percent glass fibers. Suitable separator materials are disclosed in U.S. Pat. No. 4,421,834. The disclosure of this patent is incorporated herein by reference.

Suitable nonaqueous liquid cathode materials for use in cells of this invention could be one or more of the liquid oxyhalides of an element of Group V or Group VI of the Periodic Table and/or one or more of the halides of an element of Group IV to Group VI of the Periodic Table. For example, such nonaqueous cathode material would include sulfuryl chloride, thionyl chloride, phosphorous oxychloride, thionyl bromide, chromyl chloride, vanadyl tribromide, selenium oxychloride, sulfur monochloride, sulfur monobromide, selenium tetrafluoride, selenium monobromide, thiophosphoryl chloride, triophosphoryl bromide, vanadium pentafluoride, lead tetrachloride, titanium tetrachloride, disulfur decafluoride, tin bromide trichloride, tin dibromide dichloride and tin tribromide chloride. Another suitable cathode material would be liquid sulfur dioxide.

The liquid active cathode material can either be employed by itself in an electrochemical device (i.e., galvanic cell), mixed with an ionizing solute which is a nonreactive material but is added to improve conductivity of the liquid active reducible cathode materials, or mixed with both an ionizing solute and a nonreactive or reactive cosolvent material. A nonreactive cosolvent material is one that is electrochemically inactive and, therefore, cannot function as the active cathode material while a reactive cosolvent material is one that is electrochemically active and, therefore, can function as the active cathode material.

The solute may be a simple or double salt which will produce an ironically conductive solution when dissolved in the solvent. Preferred solutes are complexes of inorganic or organic Lewis acids and inorganic ionizable salts. The only requirements for utility are that the salt, whether simple or complex, be compatible with the solvent being employed and that it yield a solution which is ironically conductive. According to the Lewis or electronic concept of acids and bases, many substances which contain no active hydrogen can act as acids or acceptors of electron doublets. The basic concept is set forth in the chemical literature (Journal of the Franklin Institute, Vol. 226 - July/December, 1938, pages 183–313 by G. N. Lewis).

A suggested reaction mechanism for the manner in which these complexes function in a solvent is described in detail in U.S. Pat. No. 3,542,602 wherein it is suggested that the complex or double salt formed between the Lewis acid and the ionizable salt yields an entity which is more stable than either of the components alone.

Typical Lewis acids suitable for use in the present invention include aluminum fluoride, aluminum bromide, aluminum chloride, antimony pentachloride, zirconium tetrachloride, phosphorus pentachloride, boron fluoride, boron chloride and boron bromide.

Ionizable salts useful in combination with the Lewis acids include lithium fluoride, lithium chloride, lithium bromide, lithium sulfide, sodium fluoride, sodium chloride, sodium bromide, potassium fluoride, potassium chloride and potassium bromide.

It will be obvious to those skilled in the at that the double salts formed by a Lewis acid and an inorganic ionizable salt may be used as such or the individual components may be added to the solvent separately to form the salt or the resulting ions in situ, One such double salt, for example, is that formed by the combination of aluminum chloride and lithium chloride to yield lithium aluminum tetrachloride.

If desired, and specifically for the halides, a cosolvent should be added to the liquid active reducible cathode and solute solution to alter the dielectric constant, viscosity or solvent properties of the solution to achieve better conductivity. Some examples of suitable cosolvents are nitrobenzene, tetrahydrofuran, 1,3-dioxolane, 3-methyl-2-oxazolidone, propylene carbonate, gamma-butyrolactone, sulfolane, ethylene glycol sulfite, dimethyl sulfite, benzoyl chloride, dimethoxyethane, dimethyl isoxazole, diethyl carbonate, sulfur dioxide and the like.

The container of the cell could be made of steel, iron, nickel, nickel-plated steel or some other suitable material.

Some preferred combinations of nonaqueous cathode materials and anodes would be as follows:

(1) sulfuryl chloride/Li or Na;
(2) thionyl chloride/Li or Na;
(3) phosphorus oxychloride/Li or Na;
(4) sulfur monochloride/Li or Na;
(5) sulfur monobromide/Li or Na;
(6) selenium tetrafluoride/Li or Na.

Preferably, the cells for use in this invention would be liquid oxyhalide cells using sulfuryl chloride, thionyl chloride or mixtures thereof with a lithium anode.

If an insulating gasket member is required to insulate the cover from the can then such gasket has to be stable in the presence of a liquid cathode, such as a oxyhalide cathode-electrolyte, and can be selected from such materials as polytetrafluoroethylene (e.g., "Teflon"), fluorinated ethylene-propylene (e.g., FEP), ethylene copolymer with FEP (e.g., "Tefzel"), chlorotrifluoroethylene (e.g., "Kel-F"), perfluoro-alkoxy polymer (e.g., PFA), and the like.

The foregoing and additional objects will become more fully apparent from the description hereinafter and the accompanying drawings.

Figure 1:
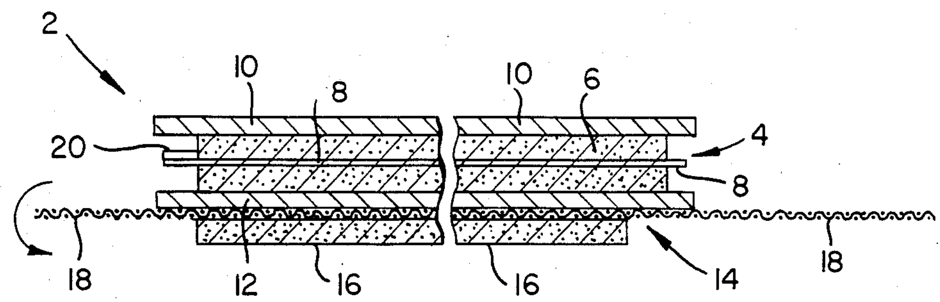
FIG. 1 is a cross-sectional plan view of an electrode and separator assembly of this invention shown in an uncoiled form.

Referring in detail to FIG. 1, there is shown an uncoiled assembly 2 composed of a cathode collector strip 4 of a carbonaceous-binder mixture 6 pressed onto and into an expanded conductive metal mesh or screen 8, both of which are sandwiched between a first nonwoven glass separator strip 10 and a second nonwoven glass separator strip 12. An anode strip 14 is composed of an active metal anode, such as lithium 16, pressed onto and into an expanded conductive metal mesh or screen 18 (anode collector), such as nickel. The anode collector 18 is extended beyond the cathode collector strip 4, separators 10 and 12, and anode strip 16. A conductive tab 20, such as nickel, is shown welded to one end of cathode collector strip 4.

Figure 2:
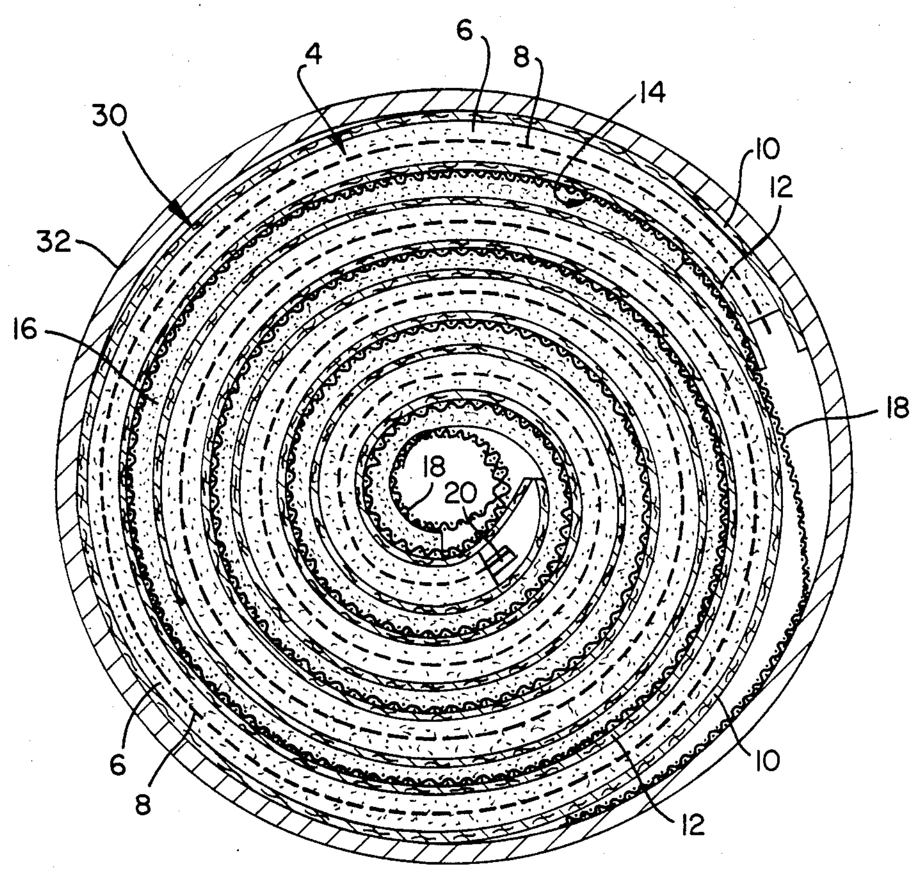
FIG. 2 is a cross-sectional plan view of the electrode strip assembly of FIG. 1 shown coiled and disposed in a cylindrical container.

As shown in FIG. 2, the superimposed strips 14, 10, 4 and 12 are helically wound into a coiled assembly 30, in the direction shown in FIG. 1, and then inserted into a conductive cylindrical container 32. Disposed within the bottom of container 32 is an insulator disc (not shown). The extended anode collector 18 defining a portion of the outer wall of coiled assembly 30 provides a electronic contact against the inner wall of the container 32 thereby adapting said container 32 as the anodic terminal of the cell.

Figure 3:
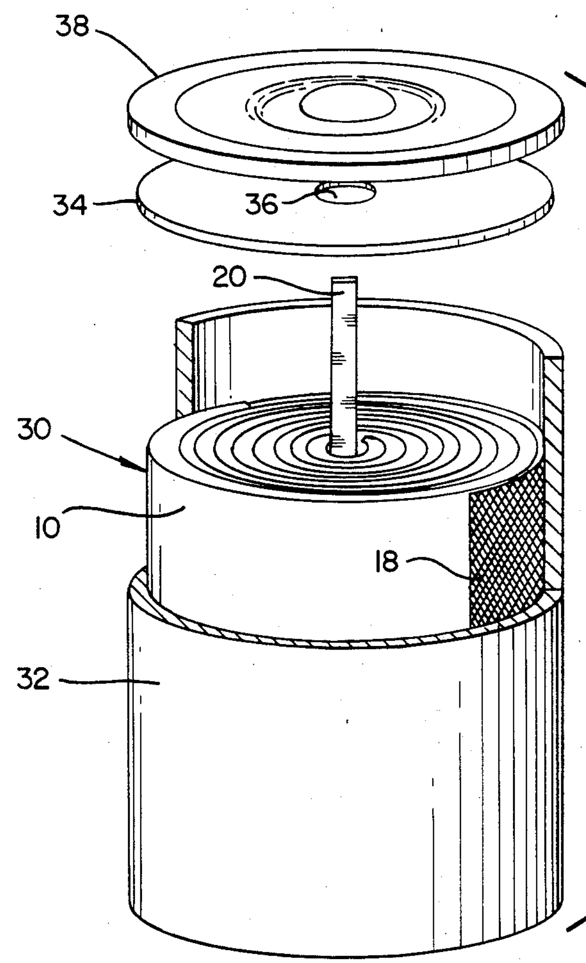
FIG. 3 is an exploded view of the coiled electrode assembly of FIG. 2.

The coiled assembly 30 of FIG. 2 is shown in FIG. 3, along with an insulator disc 34 which has a central opening 36 through which the top portion of tab 20 passes, whereupon the tab can be welded to cover 38 thereby adopting the cover 38 as the cathodic terminal of the cell. Although not shown, the cover would be insulated from the container by a conventional gasket. The cover or container could have an opening to accommodate a terminal which could be electronically connected to tab 20 and which terminal could be sealed within the opening and electronically insulated from the anodic terminal of the cell (container) by employing a glass-to-metal seal in a conventional manner.

If also desired, the catode collector could have two or more extended tabs to contact the cover so as to provide a more uniform current distribution during high rate discharge. In most applications a conventional vent would be employed in the cell's housing to release undesirable internal pressure build-up within the cell.

Figure 4:
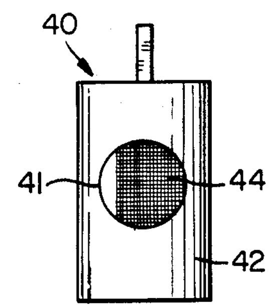
FIG. 4 is a side elevation view of another embodiment of a coiled electrode assembly of this invention.

FIG. 4 shows an alternative embodiment of a coiled electrical assembly 40 of the invention in which the separator 42 is exended and then an opening 41 is disposed in the outer wound separator 42 exposing a portion of anode collector strip 44. Coiled electrode assembly 42 could then be assembled in a container whereupon the exposed anode collector strip 44 would contact the inner wall of the container thereby adapting the container as the anodic terminal of the cell.

Modifications may be made in the construction details without departing from the spirit of the invention as set forth in the appendant claims.

What is claimed:

1. An electrochemical cell comprising a coiled electrode assembly having an anodic electrode comprising an anode strip in electrical contact with an anode collector strip, said anode collector strip extending beyond the anode strip; a cathode collector strip superimposed over the anodic electrode; a first separator disposed between said anodic electrode and said cathode collector strip; and a second separator strip disposed over the cathode collector strip; all of the strips being helically wound about each other so that the anodic electrode is the innermost wound member and the extended anode collector strip defines at least a portion of the outer wall of the coiled electrode assembly; a container comprising a base and an upstanding wall defining an opening, said coiled electrode assembly disposed within the container such that the extended anode collector defining a portion of the outer wall of the coiled electrode assembly electronically contacts the inner upstanding wall of the container thereby adapting the container as the anodic terminal for the cell; a liquid cathode-electrolyte disposed within the container and contacting the cathode collector; a cover secured to the open end of the container; and means within the container for electronically connecting the cathode collector to a terminal member disposed at the exterior surface of the cell and insulated from the anodic terminal of the cell thereby adapting the terminal member as the cathodic terminal of the cell.

2. The electrochemical cell of claim 1 wherein the anode collector strip extends beyond the second separator strip and thereby defines at least a portion of the outer wall of the coiled electrode assembly.

3. The electrochemical cell of claim 1 wherein the second separator strip extends beyond the anode collector strip and wherein the outermost wound portion of said second separator strip defining the outer wall of the coiled electrode assembly has at least one opening which exposes a portion of the anode collector strip such that the exposed portion of the anode collector strip electronically contacts the inner wall of the container thereby adapting the container as the anodic terminal of the cell.

4. The electrochemical cell of claim 1 or 2 wherein said anode strip comprises a material selected from the group consisting of lithium, sodium and calcium and said cathode collector strip comprises a carbonaceous material.

5. The electrochemical cell of claim 4 wherein said anode collector strip is nickel.

6. The electrochemical cell of claim 4 wherein said container is made from a material selected from the group consisting of steel and nickel-plated steel.

7. The electrochemical cell of claim 6 wherein said anode collector strip is nickel.

8. The electrochemical cell of claim 7 wherein said cathode collector strip comprises a carbonaceous material deposited on a conductive screen.

9. The electrochemical cell of claim 8 wherein the conductive screen is nickel.

10. The electrochemical cell of claim 4 wherein said liquid cathode electrolyte comprises a solute dissolved in a liquid active cathode, said liquid active cathode comprising at least one liquid oxyhalide of an element of Group V or Group VI of the Periodic Table.

11. The electrochemical cell of claim 10 wherein said liquid active cathode further comprises at least one halide of an element of Group IV to Group VI of the Periodic Table.

12. The electrochemical cell of claim 10 wherein said anode strip is lithium, said cathode collector comprises carbon and the liquid active cathode is selected from the group consisting of thionyl chloride, sulfuryl chloride and mixtures thereof.

13. The electrochemical cell of claim 12 wherein said anode collector is nickel and the container is made of a material selected from the group consisting of steel and nickel plated steel.

* * * * *